United States Patent

Sakakibara et al.

Patent Number: 5,232,987
Date of Patent: Aug. 3, 1993

[54] RUBBER COMPOSITIONS

[75] Inventors: Mitsuhiko Sakakibara, Matsudo; Fumio Tsutsumi, Yokkaichi; Makoto Kondo, Kameyama; Yoshiro Yagi, Kodaira, all of Japan

[73] Assignees: Japan Synthetic Rubber Co., Ltd.; Bridgestone Corporation, both of Tokyo, Japan

[21] Appl. No.: 755,599

[22] Filed: Sep. 5, 1991

Related U.S. Application Data

[63] Continuation of Ser. No. 301,770, Jan. 26, 1989, abandoned.

[30] Foreign Application Priority Data

Feb. 1, 1988 [JP] Japan .................................. 63-21771

[51] Int. Cl.⁵ .............................................. C08L 9/06
[52] U.S. Cl. .......................................... 525/98; 525/99; 525/237; 525/314; 525/316; 524/483
[58] Field of Search ............ 525/87, 99, 98, 237, 525/314, 316; 524/483

[56] References Cited

U.S. PATENT DOCUMENTS 3,646,161  2/1972  Marwede .......................... 525/99
4,843,120  6/1989  Halasa .............................. 525/237

FOREIGN PATENT DOCUMENTS 0087736   9/1983  European Pat. Off. .
55-125135  9/1980  Japan .
58-154711  9/1983  Japan .
58-164711  9/1983  Japan .
  167633  10/1983  Japan ................................ 525/237
61-252210 11/1986  Japan .
  033436   2/1988  Japan ................................ 525/237
1041309   9/1966  United Kingdom .
1501378   2/1978  United Kingdom .
2172062   9/1986  United Kingdom .

Primary Examiner—David J. Buttner
Attorney, Agent, or Firm—Sughrue, Mion, Zinn, Macpeak & Seas

[57] ABSTRACT

A rubber composition having an excellent wear resistance while holding proper hardness, modulus and the like as a vulcanizate comprises a blend of (A) styrene-diene copolymer rubber having specified content of bound styrene, glass transition temperature range and Mooney viscosity and (B) low molecular weight polymer having particular weight average molecular weight, wherein the blending ratio of the copolymer rubber (A) to the polymer (B) is 100 parts by weight to 10–120 parts by weight.

6 Claims, 1 Drawing Sheet

FIG_1
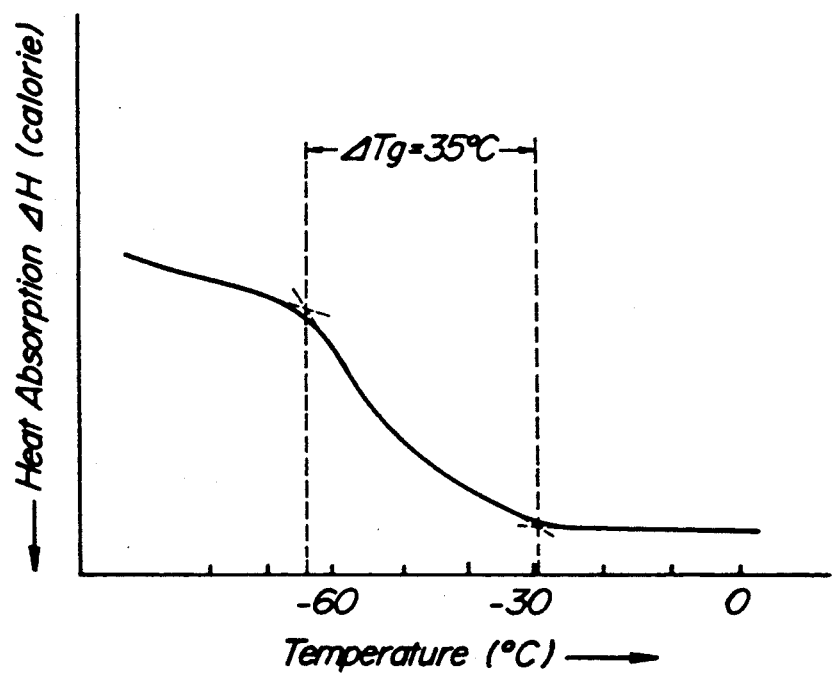

RUBBER COMPOSITIONS

This is a continuation of application Ser. No. 07/301,770 filed Jan. 26, 1989, now abandoned.

BACKGROUND OF THE INVENTION

1. Field of the Invention

This invention relates to a rubber composition comprising a specific high molecular weight styrene-diene copolymer rubber and a low molecular weight polymer and being flexible and having high tensile strength, hysteresis loss (hereinafter abbreviated as high-loss) and wear resistance.

2. Related Art Statement

The styrene-butadiene copolymer rubber (SBR) is produced in a greater amount as a so-called general-purpose rubber and has excellent in the quality and cost stabilization and also excellent antioxidation property and wear resistance as compared with the natural rubber, so that it is used in a greater amount as a starting material for automobile tires, particularly radial tire for automobile. Further, SBR is frequently used in a tread portion as a part of the radial tire for passenger car.

In the automobile tires, particularly radial tires for passenger car, the cornering stability is an important performance required in the tread portion. In order to ensure the cornering stability, it is necessary that the road gripping force (gripping property) of the tread as a high loss property is high. For this purpose, it is naturally attempted to improve the tread portion. As such a method, the improvement of tread pattern is attempted. In this method, by making deep the grooves for the formation of the pattern formed in the tread, the tread portion directly contacting with ground is easy to be deformed by the pressure applied from the road surface, whereby the ability of changing the pressure from the road surface into heat energy inside the tread, i.e. the ability of absorbing the pressure from the road surface to a certain extent is increased to improve the road gripping property of the tread.

However, in this method, the deformation of rubber is made easy, so that the worn amount of the tread portion increases and the sufficient wear resistance can not be obtained.

In order to increase the wear resistance of rubber as a tread material, a method of increasing the amount of high reinforcing carbon black filled in rubber is performed from the old times. According to this method, however, the hardness and modulus rise and it is difficult to deform the tread portion, and consequently the road gripping property is undesirably damaged.

Further, there is a method of improving the wear resistance by increasing the Mooney viscosity (a parameter of average molecular weight) of SBR as a tread material. In this method, however, the processability of SBR unfavorably lowers, so that the method itself is critical.

Moreover, there is generally proposed a method of improving the reduction of heat generation in the working and the resistance to uneven wear by combining a high molecular weight polymer with a liquid polymer. However, this is still insufficient as a tread material from a viewpoint of the balance between the gripping property and the wear resistance.

In addition, it is attempted to simultaneously establish the gripping property and the wear resistance by blending with a rubber component having a high glass transition temperature. However, the wear resistance is hardly improved by this method.

As mentioned above, the road gripping property and the wear resistance in the tire tread have a so-called conflicting relation even when using the known rubber materials, so that the improvement of both properties is considered to be very difficult.

SUMMARY OF THE INVENTION

It is, therefore, an object of the invention to solve the aforementioned problems of the conventional techniques and to provide a rubber composition having an excellent wear resistance at a state of holding proper properties such as hardness, modulus and the like as a vulcanizate, which is suitable as a tire tread portion particularly requiring the above conflicting properties of road gripping property and wear resistance and various parts such as belt and the like requiring the wear resistance.

According to the invention, there is the provision of a rubber composition comprising (A) styrene-diene copolymer rubber having a content of bound styrene of 10–65% by weight, a glass transition temperature range ($\Delta Tg$) of not lower than 10° C. and a Mooney viscosity ($ML_{1+4}$, 100° C.) of 60–200 and (B) low molecular weight polymer having a weight average molecular weight of 5,000–200,000, a blending ratio of said copolymer rubber (A) to said polymer (B) being 100 parts by weight to 10–120 parts by weight, in which a Mooney viscosity ($ML_{1+4}$, 100° C.) after the blending is not less than 20.

BRIEF DESCRIPTION OF THE DRAWING

The invention will be described with reference to the accompanying drawing, wherein:

FIG. 1 is a graph showing a relation between heat absorption and glass transition temperature range in the copolymer A-3 used in Example 2 as measured by means of differential scanning calorimeter (DSC).

DESCRIPTION OF THE PREFERRED EMBODIMENTS

In the rubber composition according to the invention, the considerable improvement of the wear resistance can be achieved with the increase of road gripping property while holding proper hardness, modulus and the like as a vulcanizate by using the combination of the low molecular weight polymer (B) with the copolymer rubber (A) having a particular glass transition temperature range or a particular composition distribution as compared with the conventional rubber composition containing, for example, aromatic series extension oil as a plasticizer for the usual copolymer rubber.

Moreover, Japanese Patent laid open No. 55-125,135 discloses an example of compounding with a low molecular weight polymer. In this case, the low molecular weight rubber having a molecular weight to an extent contributing to the crosslinking is compounded with polybutadiene rubber or butadiene-styrene copolymer rubber having a Mooney viscosity of 30–65, whereby a rubber composition having excellent processability and being less in the change of high-temperature properties as a vulcanizate with the lapse of time. This is considerably different from the invention in the Mooney viscosity of rubber to be compounded with the low molecular weight rubber due to the difference of the object. Further, this reference does not disclose the technical idea of simultaneously establishing the conflicting properties of the road gripping property and wear resistance by the synergistic action of the combination of the rubber having the particular composition distribution and the low molecular weight polymer as in the invention.

Further, Japanese Patent laid open No. 58-164,711 discloses an example of giving the composition distribution to butadiene-styrene copolymer rubber. According to this reference, when the butadiene-styrene copolymer rubber having the given composition distribution is used as a tread portion of the tire, the wear resistance and wet skid property can be improved without degrading the rolling property. However, the dry skid property and the rolling resistance have a conflicting relation, so that as the dry skid property is improved, the rolling resistance also increases. Therefore, this reference is fundamentally different from the invention aiming at the improvement of the gripping property represented by the dry skid property in the technical idea.

As mentioned above, the invention can provide a rubber material for high loss parts satisfying simultaneously the conflicting properties of road gripping property and the wear resistance, which has never been attained in the conventional techniques.

The copolymer rubber (A) used in the invention is produced by the polymerization, preferably emulsion polymerization of styrene and diene, and has a content of bound styrene of 10–65% by weight, preferably 20–45% by weight, a glass transition temperature range ($\Delta Tg$) of not lower than 10° C., preferably not lower than 30° C., more particularly 50–200° C., and a Mooney viscosity ($ML_{1+4}$, 100° C.) preferably 100–200.

In general, the bound styrene content of the styrene-diene copolymer rubber practically used is 15–50% by weight, and does not exceed 65% by weight at most. When the bound styrene content of the copolymer rubber (A) is less than 10% by weight, the high loss property and practical strength are insufficient, while when it exceeds 65% by weight, the wear resistance of the finally obtained rubber composition is insufficient.

Further, the glass transition temperature range ($\Delta Tg$) of the styrene-diene copolymer rubber (A) used in the invention is not lower than 10° C. By widening this temperature range, the wear resistance of the resulting rubber composition can largely be improved. When it is lower than 10° C., it is difficult to improve the wear resistance.

The term "glass transition temperature range ($\Delta Tg$)" used herein means a temperature range of from a first change point of heat absorption peak to a final change point at glass transition region as measured by means of a differential scanning calorimeter (hereinafter abbreviated as DSC). In FIG. 1 is shown a DSC chart of copolymer A-3 used in the following Example 2 and a method of determining $\Delta Tg$.

In the styrene-diene copolymer rubber (A), when the Mooney viscosity is less than 60, the low molecular weight polymer (B) acts as a plasticizer likewise the extension oil and consequently the Mooney viscosity of the finally obtained rubber composition lowers and it is difficult to expect the sufficient improvement of physical properties, particularly wear resistance as the vulcanizate. While, when it exceeds 200, the gel content largely increases, so that even when the high aromatic series extension oil is mixed in an amount of 37.5 parts by weight, the Mooney viscosity of the finally obtained rubber composition becomes as large as about 80 or more and hence the heat generation at the kneading or extrusion molding is large and also the gelation and scorching are undesirably caused as troubles in the processing.

The low molecular weight polymer (B) to be mixed with the styrene-diene copolymer rubber (A) includes various liquid polymers, which are preferably produced by emulsion polymerization or solution polymerization of styrene and diene, and have a weight average molecular weight of 5,000–200,000, preferably 10,000–150,000.

When the weight average molecular weight of the low molecular weight polymer (B) is less than 5,000, the resulting vulcanizate is difficult to maintain sufficient physical properties, particularly fracture stress and hence the effect of improving the road gripping force (gripping property) and wear resistance can not be expected, while when it exceeds 200,000, the fracture stress of the vulcanizate can be maintained at a high level, but the effect of improving the wear resistance is lost and the hardness and modulus become high and the shaping of the vulcanizate is difficult and the road gripping performance is insufficient.

Moreover, when the low molecular weight polymer (B) is styrene-diene copolymer, the bound styrene content is optional, but when it is more than 85% by weight, the effect of improving the wear resistance is small and the hardness and modulus of the vulcanizate become too high to form an undeformable vulcanizate and consequently the road gripping force and wear resistance are considerably poor.

According to the invention, the amount of the low molecular weight polymer (B) to be mixed with the styrene-diene copolymer rubber (A) is 10–120 parts by weight, preferably 20–100 parts by weight per 100 parts by weight of the copolymer rubber (A) so as to satisfy that the Mooney viscosity of the finally obtained rubber composition is not less than 20, preferably not less than 40, more particularly 60–100.

When the amount of the low molecular weight polymer (B) is less than 10 parts by weight per 100 parts by weight of the copolymer rubber (A), the processability such as kneadability, shapability and the like of the rubber composition degrades and hence the improvement of gripping property and wear resistance is not attained. In this case, even when adding a plasticizer such as high aromatic series extension oil or the like, the improvement of the wear resistance can not be expected. While, when it exceeds 120 parts by weight, the Mooney viscosity of the rubber composition becomes not less than 20, so that the hardness, modulus and fracture stress are low and consequently the road gripping force is sufficient but the wear resistance rather lowers and the balance therebetween can not be made good. On the contrary, the copolymer rubber (A) capable of being mixed with more than 120 parts by weight of the low molecular weight polymer (B) per 100 parts by weight of the copolymer rubber (A) can not practically be produced without gelation.

In the invention, the diene component used in the production of the styrene-diene copolymer rubber (A) or the low molecular weight polymer (B) is not particularly restricted, but includes, for example, 1,3-butadiene, 2,3-dimethyl butadiene, isoprene, chloroprene, 1,3-pentadiene, hexadiene, myrcene and the like. Among them, 1,3-butadiene is preferable.

The styrene-diene copolymer rubber (A) and low molecular weight polymer (B) according to the invention can be produced by anyone of the usual polymerization methods, preferably emulsion polymerization method.

For example, the styrene-diene copolymer rubber (A) having a glass transition temperature range (ΔTg) of not lower than 10° C. can preferably be produced by the emulsion block or graft polymerization method.

On the other hand, the styrene-diene copolymer rubber (A) having a Mooney viscosity of not less than 60 can be produced by solution polymerization, emulsion polymerization or suspension polymerization method. In this case, the Mooney viscosity of the copolymer rubber (A) is adjusted to a required value by setting the amount of the molecular weight modifier used, or by varying the kind and amount of the coupling agent and the amount of the catalyst.

Further, the low molecular weight polymer (B) can easily be obtained by increasing the amount of the molecular weight modifier such as t-dodecyl mercaptan or the like in the emulsion polymerization or the amounts of the catalyst and molecular weight modifier in the solution polymerization according to the polymerization recipe for the obtention of usual rubbery high molecular weight polymers.

As the other method for preparing the styrene-diene copolymer rubber (A) and the low molecular weight polymer (B) according to the invention, use may be made of a method wherein the copolymer rubber (A) and the low molecular weight polymer (B) are mixed at a latex state or a solution state and then solidified, a method of mixing the copolymer rubber (A) with the low molecular weight polymer (B), and the like.

Moreover, the styrene-diene copolymer rubber (A) and the low molecular weight polymer (B) can be prepared likewise the above mixing method by using a multistage method of varying the catalyst amount and the charging ratio of molecular weight modifier, styrene monomer and diene monomer and then adding the catalyst or the chain transfer agent or the monomer in the midway of the polymerization, or a specific polymerization method (hereinafter referred to as increment method), which can simultaneously provide the mixture of high molecular weight copolymer rubber (A) and low molecular weight polymer (B) by adding the coupling agent at initial state and then further adding the monomer.

The composition comprising the styrene-diene copolymer rubber (A) and the low molecular weight polymer (B) according to the invention is used alone or in admixture with other rubber component(s) such as SBR other than the component (A) or (B), cis-1,4-polyisoprene, low cis-1,4-polybutadiene, high cis-1,4polybutadiene, ethylene-propylene-diene terpolymer, chloroprene copolymer, halogenated butyl rubber, NBR, NIP and the like.

In the rubber blend, the total amount of the components (A) and (B) is not less than 30% by weight. When the amount is less than 30% by weight, the balance between the wear resistance and the gripping property is bad and the effect inherent to the invention can not be achieved.

The rubber composition according to the invention is usually used by compounding a filler of carbon black and/or silica with the rubber component consisting mainly of the above copolymer rubber (A) and polymer (B).

The amount of the filler added is 45–200 parts by weight, preferably 60–150 parts by weight per 100 parts by weight of the rubber component. When the amount of the filler is less than 45 parts by weight, the reinforcing property is insufficient and the wear resistance is poor, while when it exceeds 200 parts by weight, the viscosity of the composition undesirably rises and consequently the reinforcing property and wear resistance are degraded.

Furthermore, the rubber composition according to the invention may include fillers such as magnesium carbonate, calcium carbonate, glass fiber, aramid fiber and the like; and ordinary additives such as stearic acid, zinc white, antioxidant, vulcanization accelerator, vulcanizing agent and the like, if necessary.

The rubber compositions according to the invention are worked into a desired shape and then vulcanized, which can be applied to not only tire parts such as tread, undertread, sidewall, bead portion and the like but also other industrial articles such as hose, belt, shoe bottom, window frame, sealing material, rubber insulator and the like.

The following examples are given in illustration of the invention and are not intended as limitations thereof.

EXAMPLES 1–15, COMPARATIVE EXAMPLES 1–9

(1) Production of copolymer rubber (A), low molecular weight polymer (B)

| Polymerization recipe | (part by weight) |
|---|---|
| 1,3-butadiene | properly variable |
| styrene | properly variable |
| water for polymerization treatment | 200.0 |
| resin acid soap | 5.0 |
| ferrous sulfate heptahydrate | 0.05 |
| sodium alkylnaphthalene sulfonate | 0.15 |
| tetrasodium salt of ethylenediamine tetraacetate | 0.10 |
| sodium formaldehyde sulfoxylate | 0.15 |
| paramethane hydroperoxide | 0.10 |
| t-dodecyl mercaptan | properly variable |

The polymerization was carried out at a reaction temperature of 5° C. according to the above polymerization recipe. When the conversion ratio reached 60%, the polymerization stopper was added, and thereafter unreacted 1,3-butadiene and styrene were recovered to obtain a latex containing about 20% by weight of rubbery copolymer.

Although the charged amounts of monomer and t-dodecyl mercaptan were properly varied in accordance with the desired properties, the actually charged amounts in each sample were shown in the following Table 1. In Sample Nos. A-2 to A-13, two-stage increment method of styrene was carried out, wherein the conversion ratio at the first stage was 20% to the total charged amount of monomer including the second stage increment, and the conversion ratio at the second stage was 40%.

In Table 1 were also shown the bound styrene content of the obtained sample, the glass transition temperature range (ΔTg) and Mooney viscosity of the copolymer rubber (A) (Sample Nos. A-2 to A-13) and the weight average molecular weight of the low molecular weight polymer (B).

Moreover, the bound styrene content of the copolymer was measured by NMR at 100 MHz.

The glass transition temperature range (ΔTg) was determined by the method shown in the single figure from the measured chart of the obtained copolymer through a differential scanning calorimeter (DSC).

The measuring conditions were as follows:
Apparatus: 910 type DSC, made by DuPont
Temperature rising rate: 20° C./min The Mooney viscosity was measured by preliminarily heating the copolymer for 1 minute and heating at a temperature of 100° C. for 4 minutes.

Further, the weight average molecular weight was measured by means of GPC (gel permeation chromatography) and was a weight average molecular weight converted into polystyrene. In this case, ALC-GPC made by Waters Corporation was used as GPC and column was used by connecting GMH 3, BMH 6 and G6000H6, which were made by Toso K.K., to each other in series.

| Compounding recipe | (part by weight) |
| --- | --- |
| copolymer rubber (A) and polymer (B) | 100 |
| zinc white | 3 |
| stearic acid | 2 |
| carbon black | 75 |
| vulcanization accelerator | 1.5 |
| sulfur | 2 |
| (vulcanization conditions) | 155° C. × 30 minutes |

The tests for the following properties were made with respect to the thus obtained rubber compositions:

① Properties at normal state (measured according to JIS K6301)

300% modulus (kgf/cm$^2$)

TABLE 1

| Sample No. | Bound styrene content (wt %) | Mooney viscosity (ML$_{1+4}$, 100° C.) | ΔTg (°C.) | Weight average molecular weight (Mw × 10$^{-4}$) | Amount charged before start of polymerization (part by weight) 1,3-butadiene | styrene | t-dodecyl mercaptan | Amount of increment styrene charged (part by weight) first stage | second stage |
| --- | --- | --- | --- | --- | --- | --- | --- | --- | --- |
| A-1 | 0 | 158 | 8 | — | 100 | 0 | 0.14 | — | — |
| A-2 | 17 | 152 | 32 | — | 73 | 2 | 0.13 | 12 | 13 |
| A-3 | 25 | 156 | 35 | — | 64 | 11 | 0.12 | 12 | 13 |
| A-4 | 45 | 156 | 35 | — | 43 | 35 | 0.07 | 11 | 11 |
| A-5 | 35 | 154 | 70 | — | 50 | 6 | 0.10 | 22 | 22 |
| A-6 | 45 | 156 | 70 | — | 42 | 17 | 0.07 | 20 | 21 |
| A-7 | 60 | 152 | 73 | — | 29 | 37 | 0.02 | 17 | 17 |
| A-8 | 70 | 143 | 72 | — | 20 | 55 | 0.02 | 12 | 13 |
| A-9 | 45 | 53 | 70 | — | 42 | 17 | 0.07 | 20 | 21 |
| A-10 | 45 | 81 | 72 | — | 42 | 17 | 0.07 | 20 | 21 |
| A-11 | 45 | 218 | 72 | — | 42 | 17 | 0.02 | 20 | 21 |
| A-12 | 45 | 155 | 5 | — | 11 | 13 | 0.07 | 41 | 45 |
| A-13 | 44 | 159 | 26 | — | 45 | 38 | 0.07 | 8 | 9 |
| B-1 | 23 | — | — | 0.45 | 71 | 29 | 20 | — | — |
| B-2 | 24 | — | — | 0.69 | 71 | 29 | 12 | — | — |
| B-3 | 23 | — | — | 8.2 | 71 | 29 | 1 | — | — |
| B-4 | 23 | — | — | 18 | 71 | 29 | 0.5 | — | — |
| B-5 | 24 | — | — | 23 | 71 | 29 | 0.4 | — | — |
| B-6 | 0 | — | — | 8.3 | 100 | 0 | 1.4 | — | — |
| B-7 | 45 | — | — | 7.9 | 47 | 53 | 0.5 | — | — |
| B-8 | 60 | — | — | 7.1 | 29 | 71 | 0.3 | — | — |
| B-9 | 85 | — | — | 9.3 | 10 | 90 | 0.2 | — | — |

(2) PREPARATION AND EVALUATION OF RUBBER COMPOSITION

The copolymer rubber (A) and polymer (B) obtained in the above item (1) were mixed at a mixing ratio as shown in the following Table 2, solidified by usual acid-salt solidification process, washed with water and dried to obtain rubber compositions for Examples 1 to 15 and Comparative Examples 1 to 9.

Each of these rubber compositions was kneaded by means of a Banbury mixer and roll according to the following compounding recipe, and then press-cured under the following vulcanization conditions to obtain a vulcanized rubber sample.

tensile strength (kgf/cm$^2$)

② Wear resistance (Lambourn abrasion index)

It was measured by a Lambourn abrasion test method (ASTM D2228, slipping ratio: 25%).

It was represented by an index on the basis that the wear resistance of Comparative Example 5 was 100.

③ Road gripping property

The dry skid property was measured by using a portable skid tester made by British Road Laboratories.

In this case, asphalt was used as a test road surface. It was represented by an index on the basis that the dry skid property of Comparative Example 5 was 100.

The measured results are shown in Table 2.

TABLE 2(a)

| | | Example 1 | Example 2 | Example 3 | Example 4 | Example 5 | Example 6 | Example 7 | Example 8 |
| --- | --- | --- | --- | --- | --- | --- | --- | --- | --- |
| Properties of polymers | | | | | | | | | |
| Copolymer (A) | sample No. | A-2 | A-3 | A-4 | A-5 | A-6 | A-7 | A-10 | A-6 |
| | bound styrene content (wt %) | 17 | 25 | 45 | 35 | 45 | 60 | 45 | 45 |
| | ΔTg (°C.) | 32 | 35 | 35 | 70 | 70 | 73 | 72 | 70 |
| | Mooney viscosity | 152 | 156 | 156 | 154 | 156 | 152 | 81 | 156 |
| Polymer (B) | sample No. | B-3 | B-3 | B-3 | B-3 | B-3 | B-3 | B-3 | B-2 |
| | bound styrene content (wt %) | 23 | 23 | 23 | 23 | 23 | 23 | 23 | 24 |
| | weight average molecular | 8.2 | 8.2 | 8.2 | 8.2 | 8.2 | 8.2 | 8.2 | 0.69 |

TABLE 2(a)-continued

|  | Example 1 | Example 2 | Example 3 | Example 4 | Example 5 | Example 6 | Example 7 | Example 8 |
|---|---|---|---|---|---|---|---|---|
| weight ($\times 10^{-4}$) |  |  |  |  |  |  |  |  |
| Rubber composition |  |  |  |  |  |  |  |  |
| copolymer (A)/polymer (B) (weight ratio) | 100/37.5 | 100/37.5 | 100/37.5 | 100/37.5 | 100/37.5 | 100/37.5 | 100/37.5 | 100/37.5 |
| Mooney viscosity ($ML_{1+4}$, 100° C.) | 72 | 74 | 74 | 74 | 75 | 72 | 32 | 69 |
| Properties of vulcanized rubber |  |  |  |  |  |  |  |  |
| 300% modulus (kgf/cm$^2$) | 129 | 138 | 154 | 147 | 156 | 210 | 111 | 121 |
| tensile strength (kgf/cm$^2$) | 264 | 272 | 289 | 286 | 296 | 292 | 256 | 266 |
| Lambourn abrasion index | 146 | 131 | 120 | 148 | 135 | 106 | 112 | 108 |
| dry skid index | 94 | 98 | 113 | 110 | 118 | 111 | 119 | 114 |

TABLE 2(b)

|  |  | Example 9 | Example 10 | Example 11 | Example 12 | Example 13 | Example 14 | Example 15 | Comparative Example 1 |
|---|---|---|---|---|---|---|---|---|---|
| Properties of polymers |  |  |  |  |  |  |  |  |  |
| Copolymer (A) | sample No. | A-6 | A-13 | A-6 | A-6 | A-6 | A-5 | A-3 | A-1 |
|  | bound styrene content (wt %) | 45 | 44 | 45 | 45 | 45 | 35 | 25 | 0 |
|  | ΔTg (°C.) | 70 | 26 | 70 | 70 | 70 | 70 | 35 | 8 |
|  | Mooney viscosity | 156 | 159 | 156 | 156 | 156 | 154 | 156 | 158 |
| Polymer (B) | sample No. | B-4 | B-3 | B-3 | B-3 | B-6 | B-7 | B-8 | B-3 |
|  | bound styrene content (wt %) | 23 | 23 | 23 | 23 | 0 | 45 | 60 | 23 |
|  | weight average molecular weight ($\times 10^{-4}$) | 18 | 8.2 | 8.2 | 8.2 | 8.3 | 7.9 | 7.1 | 8.2 |
| Rubber composition |  |  |  |  |  |  |  |  |  |
| copolymer (A)/polymer (B) (weight ratio) | | 100/37.5 | 100/37.5 | 100/15 | 100/110 | 100/37.5 | 100/37.5 | 100/37.5 | 100/37.5 |
| Mooney viscosity ($ML_{1+4}$, 100° C.) | | 83 | 75 | 105 | 23 | 74 | 87 | 90 | 76 |
| Properties of vulcanized rubber |  |  |  |  |  |  |  |  |  |
| 300% modulus (kgf/cm$^2$) | | 172 | 152 | 241 | 104 | 134 | 225 | 233 | 96 |
| tensile strength (kgf/cm$^2$) | | 307 | 292 | 289 | 248 | 251 | 287 | 276 | 222 |
| Lambourn abrasion index | | 140 | 114 | 111 | 108 | 142 | 142 | 130 | 153 |
| dry skid index | | 116 | 113 | 116 | 122 | 116 | 119 | 102 | 81 |

TABLE 2(c)

|  |  | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Properties of polymers |  |  |  |  |  |  |  |  |  |
| Copolymer (A) | sample No. | A-8 | A-9 | A-11 | A-12 | A-6 | A-6 | A-6 | A-6 |
|  | bound styrene content (wt %) | 70 | 45 | 45 | 45 | 45 | 45 | 45 | 45 |
|  | ΔTg (°C.) | 72 | 70 | 72 | 5 | 70 | 70 | 70 | 70 |
|  | Mooney viscosity | 143 | 53 | 218 | 155 | 156 | 156 | 156 | 156 |
| Polymer (B) | sample No. | B-3 | B-3 | B-3 | B-3 | B-1 | B-5 | B-3 | B-3 |
|  | bound styrene content (wt %) | 23 | 23 | 23 | 23 | 23 | 24 | 23 | 23 |
|  | weight average molecular weight ($\times 10^{-4}$) | 8.2 | 8.2 | 8.2 | 8.2 | 0.45 | 23 | 8.2 | 8.2 |
| Rubber composition |  |  |  |  |  |  |  |  |  |
| copolymer (A)/polymer (B) (weight ratio) | | 100/37.5 | 100/37.5 | 100/37.5 | 100/37.5 | 100/37.5 | 100/37.5 | 100/7 | 100/130 |
| Mooney viscosity ($ML_{1+4}$, 100° C.) | | 63 | 13 | 142 | 73 | 66 | 89 | 127 | 18 |
| Properties of vulcanized rubber |  |  |  |  |  |  |  |  |  |
| 300% modulus (kgf/cm$^2$) | | 247 | 98 | gelation | 145 | 105 | 178 | gelation | 102 |
| tensile strength (kgf/cm$^2$) | | 298 | 134 |  | 260 | 233 | 314 |  | 145 |
| Lambourn abrasion index | | 87 | 76 |  | 100 | 96 | 104 |  | 81 |
| dry skid index | | 89 | 120 |  | 100 | 94 | 102 |  | 124 |

The following features are understood from the results of Table 2.

That is, as shown in Comparative Example 1, when the bound styrene content of the copolymer rubber (A) is less than 10% by weight, the road gripping property and strength are poor.

In Comparative Example 2, the bound styrene content of the copolymer rubber (A) exceeds 65% by weight, so that the wear resistance and road gripping property are considerably poor though the tensile strength is high.

In Comparative Example 3, the Mooney viscosity of the copolymer rubber (A) is less than 60, so that the Mooney viscosity of the rubber composition becomes less than 20 and the tensile strength and wear resistance are poor.

In Comparative Example 4, the Mooney viscosity of the copolymer rubber (A) exceeds 200, so that the vulcanized rubber is gelated.

When the glass transition temperature range of the copolymer rubber (A) is lower than 20° C. as shown in Comparative Example 5, all of tensile strength, wear resistance and road gripping property are poor as compared with those of Example 5.

In Comparative Example 6, the weight average molecular weight of the polymer (B) is less than 5,000, so that all of tensile strength, wear resistance and road gripping property are poor.

In Comparative Example 7, the weight average molecular weight of the polymer (B) exceeds 200,000, so that the wear resistance is particularly poor though the tensile strength is high.

When the amount of the polymer (B) per 100 parts by weight of the copolymer rubber (A) is less than 10 parts by weight as shown in Comparative Example 8, the resulting vulcanized rubber is gelated.

When the amount of the polymer (B) per 100 parts by weight of the copolymer rubber (A) exceeds 120 parts by weight as shown in Comparative Example 9, the road gripping property is good, but the tensile strength and wear resistance are poor.

On the contrary, in all examples according to the invention, the properties of the vulcanized rubbers at normal state are excellent, and further the wear resistance can be improved without damaging the dry skid property and gripping property.

As mentioned above, the rubber compositions according to the invention comprise a blend of the copolymer rubber (A) having particular bound styrene content, a particular glass transition temperature range ($\Delta Tg$) and a high molecular weight and the particular low molecular weight polymer (B) and have proper properties such as hardness, modulus and the like as a vulcanizate, so that they are suitable as a material for tire tread portion particularly requiring the conflicting properties of road gripping property and wear resistance as well as various parts such as belt, shoe bottom and the like requiring the wear resistance.

What is claimed is:

1. A rubber composition comprising:
   (A) a styrene-diene copolymer rubber produced by emulsion polymerization having a content of bound styrene of 10–65% by weight, a glass transition temperature range ($\Delta Tg$) of not lower than 10° C., and a Mooney viscosity ($ML_{1+4}$, 100° C.) of 60–200, and
   (B) a low molecular weight polymer having a weight average molecular weight of 5,000–200,000, wherein said polymer (B) is a styrene-diene polymer,
   wherein the blending ratio of said copolymer (A) to said polymer (B) is 100 parts by weight to 10–120 parts by weight, and wherein the Mooney viscosity ($ML_{1+4}$, 100° C.) of the rubber composition after the blending is not less than 20.

2. The rubber composition according to claim 1, wherein said glass transition temperature range ($\Delta Tg$) is now lower than 30° C.

3. The rubber composition according to claim 1, wherein said bound styrene content is 20–45% by weight.

4. The rubber composition according to claim 1, wherein said Mooney viscosity of said copolymer rubber (A) is 100–200.

5. The rubber composition according to claim 1, wherein said blending ratio of said polymer (B) per 100 parts by weight of said copolymer rubber (A) is 20–100 parts by weight. pg,33

6. The rubber composition according to claim 1, wherein said polymer (B) has a weight average molecular weight of 10,000–150,000.

* * * * *